United States Patent
Popescu et al.

(10) Patent No.: US 7,574,918 B2
(45) Date of Patent: Aug. 18, 2009

(54) METHOD AND APPARATUS FOR DETECTING VIBRATIONS FROM A MECHANICAL COMPONENT

(75) Inventors: George Popescu, Cincinnati, OH (US); Kenny C. Gross, San Diego, CA (US); Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 217 days.

(21) Appl. No.: 11/593,743

(22) Filed: Nov. 6, 2006

(65) Prior Publication Data

US 2008/0105056 A1      May 8, 2008

(51) Int. Cl.
    *G01H 11/00*      (2006.01)
(52) U.S. Cl. ............................. 73/660; 73/661
(58) Field of Classification Search ............ 73/660, 73/661, 587, 632; 340/683
    See application file for complete search history.

(56) References Cited

U.S. PATENT DOCUMENTS

| 4,895,025 | A  | * | 1/1990  | Betts ........................... 73/587 |
| 4,898,022 | A  | * | 2/1990  | Yumoto et al. ................ 73/46 |
| 6,523,413 | B1 | * | 2/2003  | Hoshino et al. ............... 73/660 |
| 7,117,742 | B2 | * | 10/2006 | Kim ............................ 73/587 |
| 7,271,706 | B2 | * | 9/2007  | Lee .......................... 340/384.2 |

* cited by examiner

*Primary Examiner*—John E Chapman
(74) *Attorney, Agent, or Firm*—Park, Vaughan & Fleming LLP

(57) ABSTRACT

A system that detects vibrations from a mechanical component, such as a disk drive. The system includes an excitation rod, a membrane, and a microphone. During operation, the mechanical component is coupled to the excitation rod which is coupled to the membrane, so that vibrations from the mechanical component are mechanically coupled through the excitation rod to the membrane. The membrane then converts the mechanical vibrations into acoustic waves that are transmitted through a medium. The microphone detects the acoustic waves in the medium and converts the acoustic waves into signals.

10 Claims, 7 Drawing Sheets

METHOD AND APPARATUS FOR DETECTING VIBRATIONS FROM A MECHANICAL COMPONENT

RELATED APPLICATION

This application is related to a pending U.S. patent application, entitled "Method and Apparatus for Detecting the Onset of Hard Disk Failures," by inventors Aleksey M. Urmanov and Kenny C. Gross, having Ser. No. 11/205,472, and filing date 16 Aug. 2005. The above-listed application is hereby incorporated by reference.

BACKGROUND

1. Field of the Invention

The present invention relates to a method and apparatus for detecting vibrations from a mechanical component.

2. Related Art

Enterprise computer systems often include a large number of hard disk drives. For example, a single server system can sometimes have as many as 15,000 hard disk drives. Losing data stored on these disk drives can have a devastating effect on an organization. For example, airlines rely on the integrity of data stored in their reservation systems for most of their day-to-day operations, and would essentially cease to function if this data became lost or corrupted. If fault-prone hard disk drives can be identified before they fail, preventative measures can be taken to avoid such failures.

Present techniques for identifying hard disk drives that are likely to fail have many drawbacks. One technique analyzes internal counter-type variables, such as read retries, write retries, seek errors, dwell time (time between reads/writes) to determine whether a disk drive is likely to fail. Unfortunately, in practice, this technique suffers from a high missed-alarm probability (MAP) of 50%, and a false-alarm probability (FAP) of 1%. This high MAP increases the probability of massive data loss, and the FAP causes a large number of No-Trouble-Found (NTF) drives to be returned, resulting in increased warranty costs.

Another technique monitors internal discrete performance metrics within disk drives, for example, by monitoring internal diagnostic counter-type variables called "SMART variables." However, hard disk drive manufacturers are reluctant to add extra diagnostics to monitor these variables, because doing so increases the cost of the commodity hard disk drives. Furthermore, in practice, this technique fails to identify approximately 50% of imminent hard disk drive failures.

To prevent catastrophic data loss due to hard disk failures, systems often use redundant arrays of inexpensive disks (RAID). Unfortunately, because the capacity of hard disk drives have increased dramatically in recent years, the time needed to rebuild a RAID disk after a failure of one of the disks has also increased dramatically. Consequently, the rebuild process can take many hours to several days, during which time the system is susceptible to a second hard disk drive failure which would cause massive data loss. Furthermore, data loss can occur if a second disk fails before a first disk is replaced. Hence, even the most advanced redundancy-based solutions are susceptible to data loss.

During operation, a disk drive produces vibrations (and/or acoustic signatures) which can contain important diagnostic information (e.g., frequency, amplitude, and phase) related to the health of the disk drive. For example, the vibration information for hard disk drives can indicate whether a spindle assembly is failing. Furthermore, vibration signatures are typically unique for different failure modes. For example, ball bearing imperfections or defects have a unique frequency related to the spindle rotational frequency. This vibration information is useful for predicting hard disk drive failures. Hence, accelerometers or microphones can be used to acquire vibration or acoustic signatures from hard disk drives. Unfortunately, accelerometers are too expensive to deploy across large systems. On the other hand, microphones are cheaper, but they pick up external sounds which are not related to the hard disk drives being monitored, and the recording of these sounds is highly undesirable for security and privacy reasons.

Hence, what is needed is a method and an apparatus for detecting vibrations without the problems described above.

SUMMARY

One embodiment of the present invention provides a system that detects vibrations from a mechanical component, such as a disk drive. The system includes an excitation rod, a membrane, and a microphone. During operation, the mechanical component is coupled to the excitation rod which is coupled to the membrane, so that vibrations from the mechanical component are mechanically coupled through the excitation rod to the membrane. The membrane then converts the mechanical vibrations into acoustic waves that are transmitted through a medium. The microphone detects the acoustic waves in the medium and converts the acoustic waves into signals.

In a variation on this embodiment, the medium includes air.

In a variation on this embodiment, the system also includes an acoustically insulated enclosure which encloses the membrane, the microphone, and the medium, wherein the acoustically insulated enclosure prevents external acoustic sources from being detected by the microphone.

In a variation on this embodiment, the system also includes a data acquisition system which is coupled to the microphone, wherein the signals generated by the microphone are received by the data acquisition system, and wherein the data acquisition system analyzes the signals to determine the health of the mechanical component.

In a variation on this embodiment, the mechanical component can include: a hard disk drive; a chassis fan; a power supply fan; a processor fan; or any other device that produces mechanical vibrations during normal operation.

In a variation on this embodiment, the amplitude of the acoustic waves generated by the membrane can be adjusted by adjusting physical properties of the membrane.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

One embodiment of the present provides a mechanism to detect vibration signatures for a mechanical component. In one embodiment of the present invention, the mechanical component can include a hard disk drive, a chassis fan, a power supply fan, a processor fan, or any other device that produces mechanical vibrations during normal operation.

One embodiment of the present invention isolates the mechanical vibrations produced by a mechanical component so that other mechanical vibrations and acoustic waves are not detected.

One embodiment of the present invention detects mechanical vibrations and converts the mechanical vibrations into electrical signals which can be recorded and analyzed by a diagnostic system to evaluate the current state or health of the mechanical component. In one embodiment of the present invention, the diagnostic system can determine the remaining useful life of the mechanical component.

One embodiment of the present invention uses the vibration signatures to provide early notification of the onset of failure in the mechanical component. For example, a hard disk drive failure may result from degradation in spindle bearings or spindle motors of a hard disk drive. Hence, this embodiment provides early notification of the onset of degradation for a hard disk drive so that the hard disk drive can be replaced before failure occurs.

Figure 1:
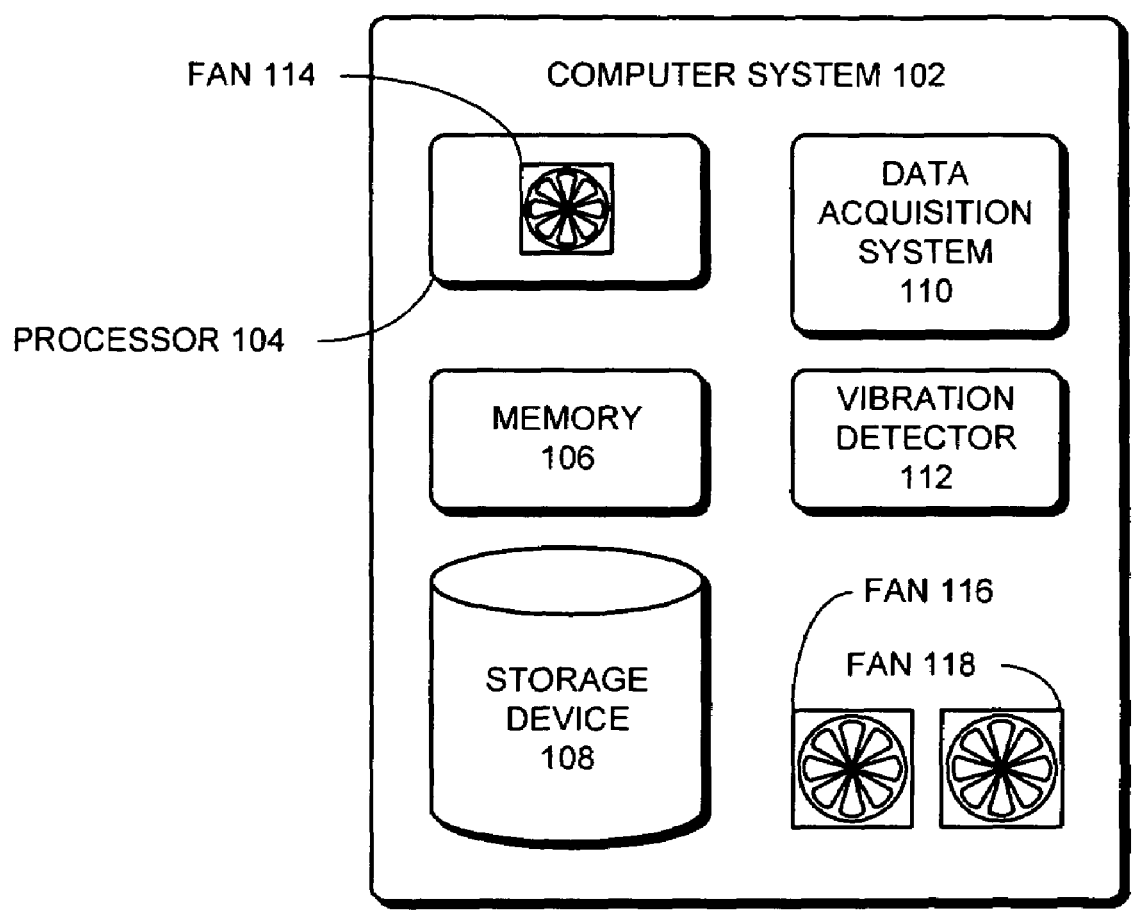
FIG. 1 illustrates a computer system in accordance with an embodiment of the present invention.

FIG. 1 illustrates a computer system 102 in accordance with an embodiment of the present invention. Computer system 102 includes processor 104, memory 106, storage device 108, data acquisition system 110, and vibration detector 112. Fan 114 provides cooling to processor 104, and fans 116 and 118 provide cooling to the chassis for computer system 102. Note that computer system 102 can contain more or fewer fans depending on the application.

Processor 104 can generally include any type of processor, including, but not limited to, a microprocessor, a mainframe computer, a digital signal processor, a personal organizer, a device controller and a computational engine within an appliance. Memory 106 can include any type of memory, including but not limited to, dynamic random access memory (DRAM), static random access memory (SRAM), flash memory, and read only memory (ROM). Storage device 108 can include any type of non-volatile storage device that can be coupled to a computer system. This includes, but is not limited to, magnetic, optical, and magneto-optical storage devices, as well as storage devices based on flash memory and/or battery-backed up memory.

In one embodiment of the present invention, data acquisition system 110 is separate from computer system 102. For example, data acquisition system 110 can be a standalone system or can be within another computer system.

In one embodiment of the present invention, vibration detector 112 is coupled to a mechanical component within computer system 102. For example, vibration detector 112 can be coupled to storage device 108 or to fans 114-118. In another embodiment of the present invention, a vibration detector is provided for each mechanical component within computer system 102. In another embodiment of the present invention, vibration detectors are used for a subset of mechanical components within computer system 102.

In one embodiment of the present invention, vibration detector 112 is coupled to data acquisition system 110. Data acquisition system 110 analyzes the signals sent from vibration detector 112 and determines the health of the mechanical component.

Figure 2:
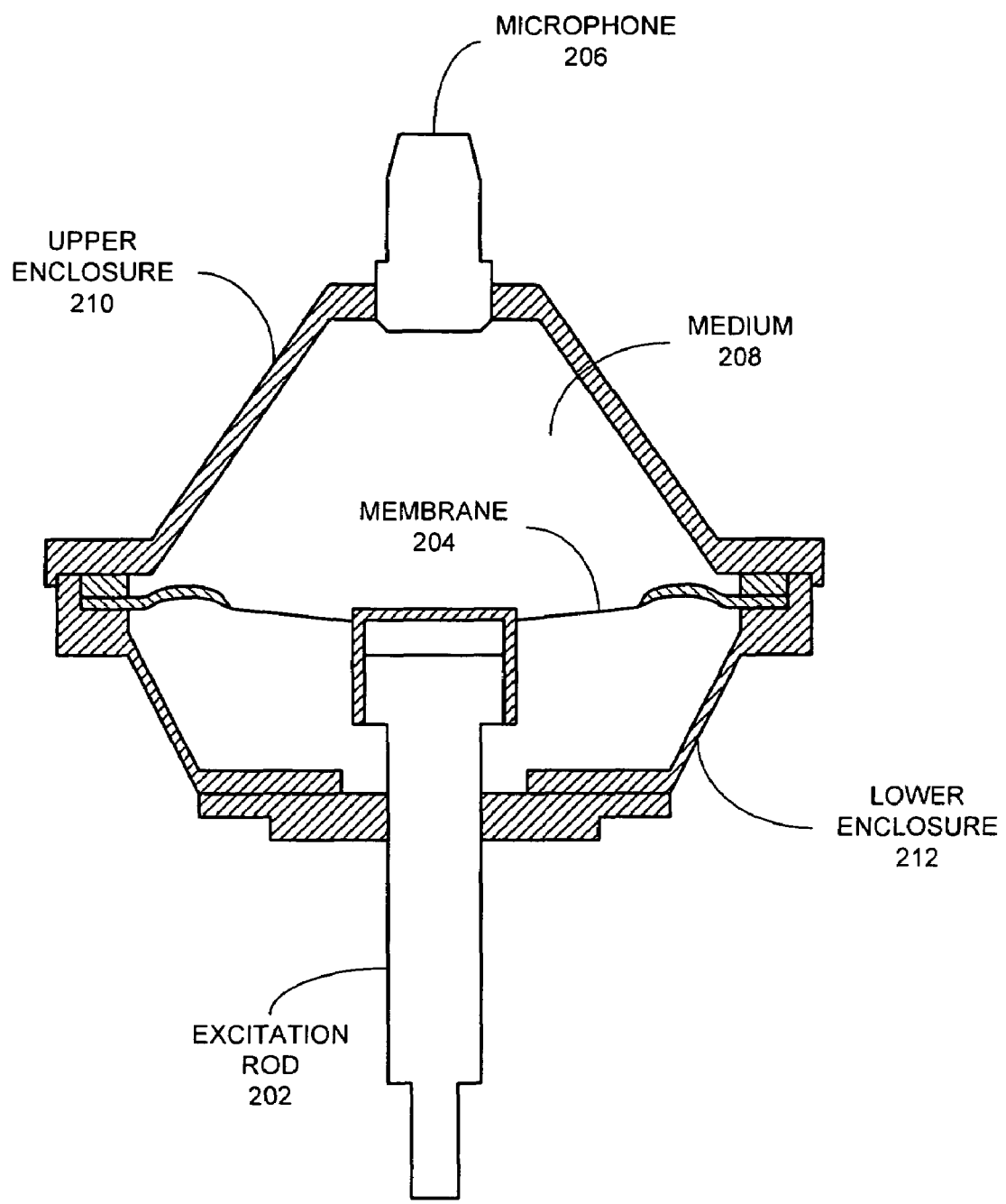
FIG. 2 illustrates a vibration detector in accordance with an embodiment of the present invention.
Figure 3:
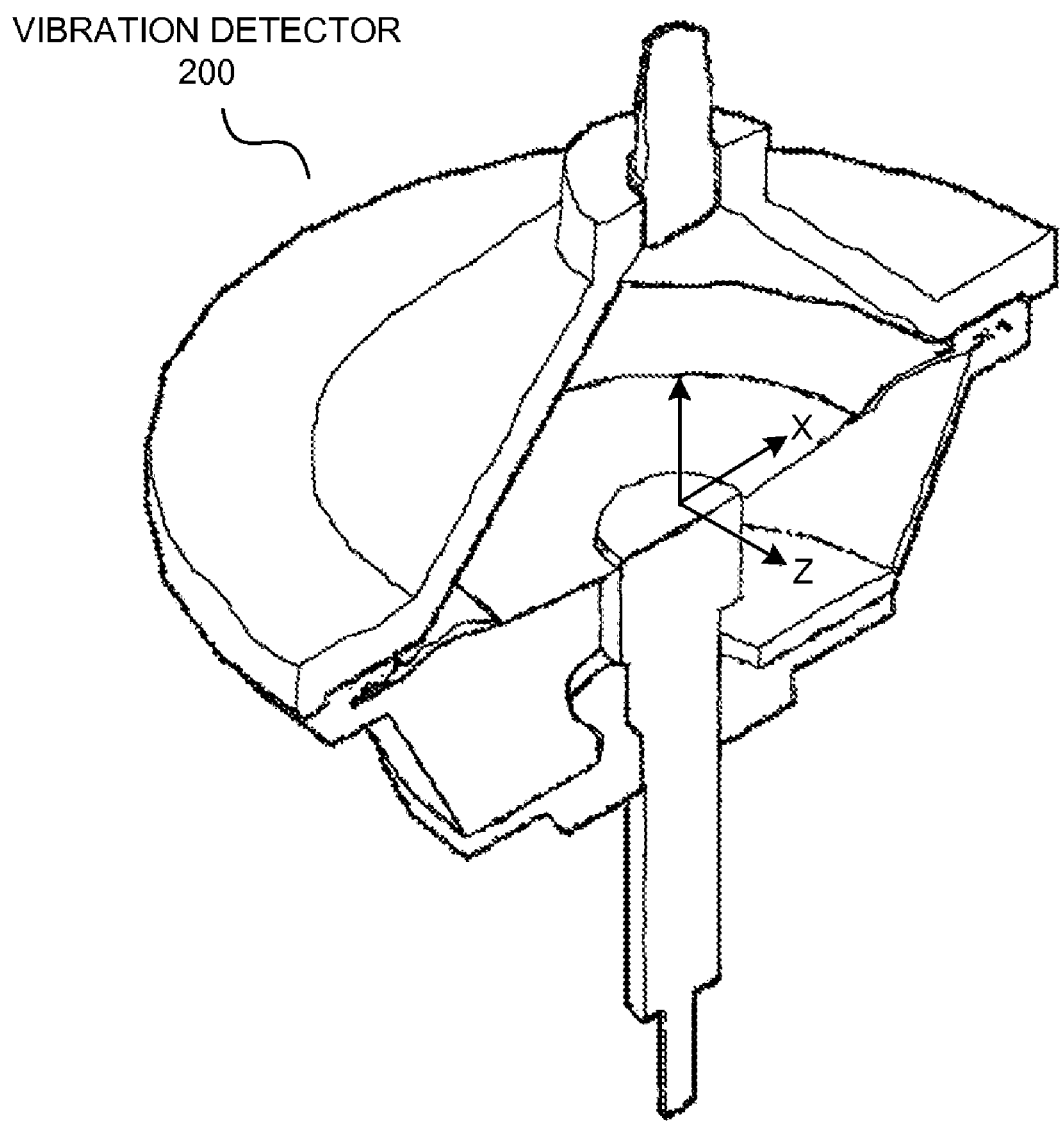
FIG. 3 illustrates another view of the vibration detector presented in FIG. 2 in accordance with an embodiment of the present invention.

FIG. 2 illustrates a vibration detector 200 in accordance with an embodiment of the present invention. (Note that FIG. 3 presents a three-dimensional view of vibration detector 200.) Vibration detector 200 includes excitation rod 202, membrane 204 and microphone 206.

In one embodiment of the present invention, excitation rod 202 can be coupled to a mechanical component under test. In this embodiment, vibrations from the mechanical component are coupled through excitation rod 202 to membrane 204, which converts the mechanical vibrations into acoustic waves that are transmitted through medium 208. In one embodiment of the present invention, the amplitude of the acoustic waves generated by membrane 204 can be adjusted by adjusting physical properties of membrane 204. For example, the physical properties that can be adjusted can include, but are not limited to, the material used for membrane 204, the thickness of membrane 204, the area of membrane 204, the tension on membrane 204.

In one embodiment of the present invention, medium 208 is air. In other embodiments of the present invention, medium 208 can be a liquid, a gas, or a solid. Microphone 206 detects the acoustic waves in medium 208 and converts the acoustic waves into electrical signals. In one embodiment of the present invention, the electrical signals are transmitted to data acquisition system 110.

In one embodiment of the present invention, upper enclosure 210 and lower enclosure 212 insulate membrane 204, microphone 206, and medium 208 from external vibrations and acoustic sources. This prevents microphone 206 from picking up conversations with a data center.

Figure 4:
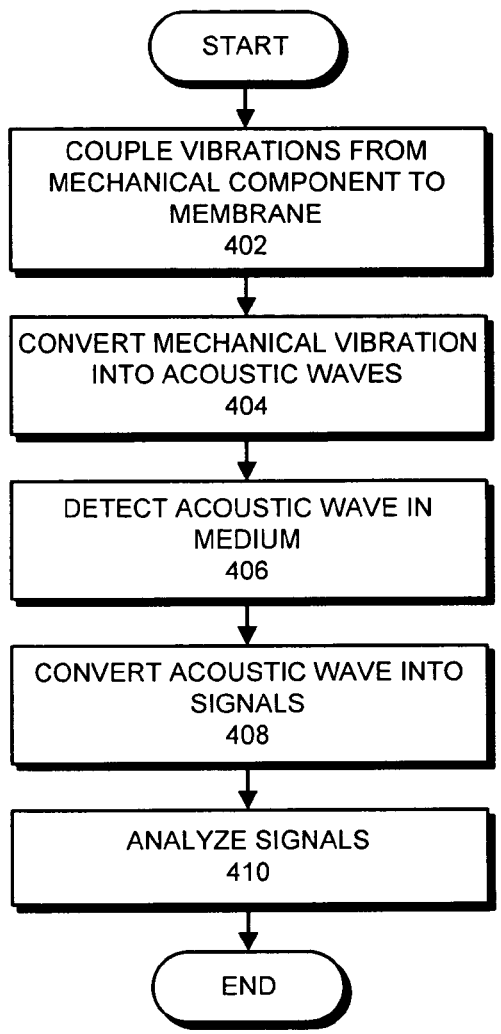
FIG. 4 presents a flowchart illustrating the process of detecting vibrations in accordance with an embodiment of the present invention.

FIG. 4 presents a flowchart illustrating the process of detecting vibrations in accordance with an embodiment of the present invention. The process begins when the system uses an excitation rod to couple vibrations from the mechanical component to a membrane (step 402). Next, the system uses the membrane to convert the mechanical vibrations into acoustic waves that are transmitted through a medium (step 404). The system then uses a microphone to detect the acoustic waves in the medium (step 406) and to convert the acoustic waves into electrical signals (step 408). Next, the system uses a data acquisition system which is coupled to the microphone to analyze the electrical signals to determine the health of the mechanical component (step 410).

Figure 5:
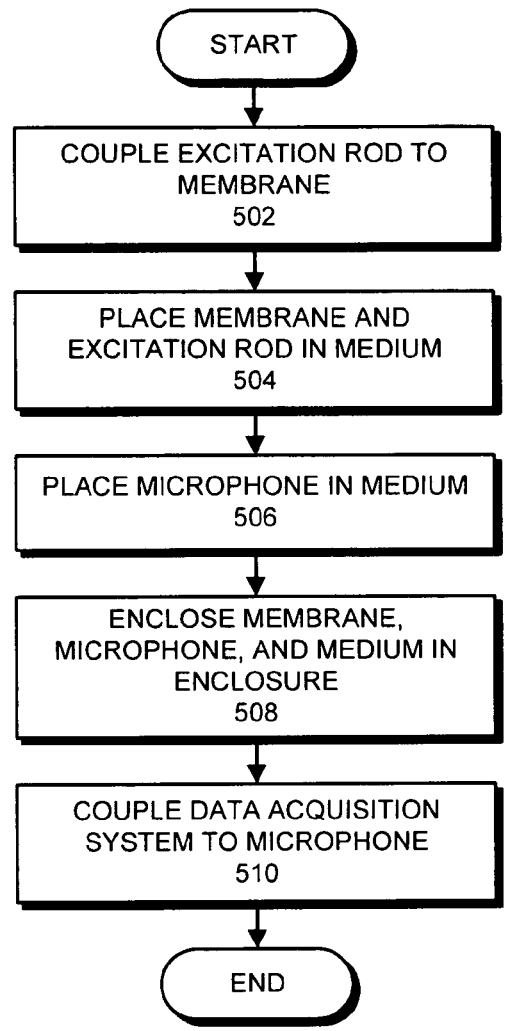
FIG. 5 presents a flowchart illustrating the process of manufacturing the vibration detector in accordance with an embodiment of the present invention.

FIG. 5 presents a flowchart illustrating the process of manufacturing the vibration detector in accordance with an embodiment of the present invention. The process begins when the system couples an excitation rod to a membrane (step 502). Next, the system places the membrane and the rod in a medium (step 504). The system then places a microphone in the medium (step 506). Next, the system encloses the membrane, the microphone, and the medium in an acoustically insulated enclosure, wherein the acoustically insulated enclosure prevents external acoustic sources from being detected by the microphone (step 508). The system then couples a data acquisition system to the microphone, wherein the electrical signals generated by the microphone are received by the data acquisition system, and wherein the data acquisition system analyzes the electrical signals to determine the health of the mechanical component (step 510).

Using Vibration Signatures to Detect Incipient Failures

Figure 6:
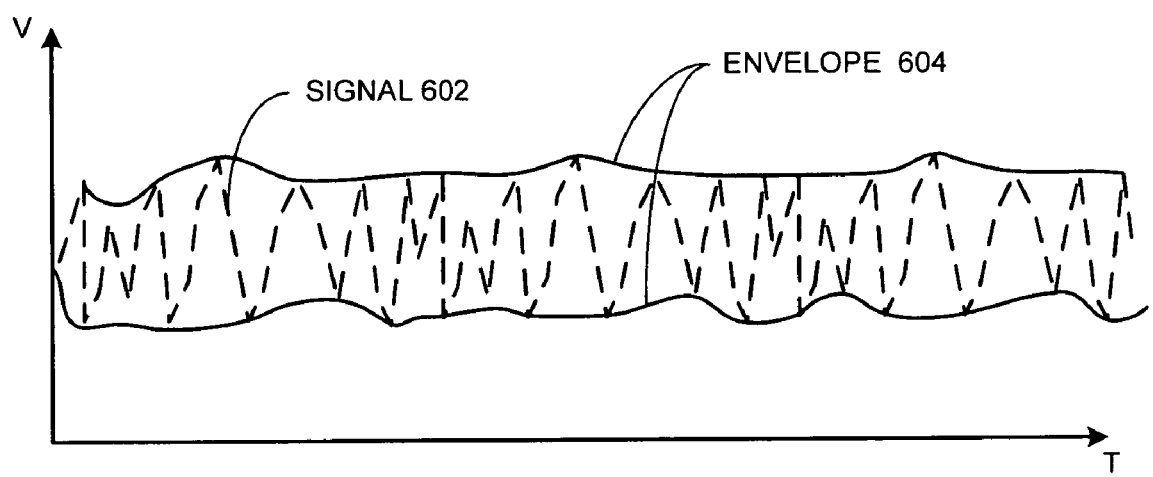
FIG. 6 illustrates a vibration signal output from a vibration sensor mounted on a hard disk drive in accordance with an embodiment of the present invention.

FIG. 6 illustrates a vibration signal output from a vibration sensor mounted on a hard disk drive in accordance with an embodiment of the present invention. It illustrates vibration signal 602 and envelope function 604. Note that envelope function 604 encloses vibration signal 602. Also note that the system identifies vibration sensor attachment points on a single hard disk drive or in a hard disk drive array, and collects vibration data from the chosen vibration sensors for known good, known defective, and suspect hard disk drives.

In one embodiment of the present invention, the following operations are performed by the system to proactively detect incipient failures. Vibration signal 602 is first preprocessed using a Hilbert transform to compute an analytical signal. Next, envelope function 604 is generated from the analytic signal and a Fourier transform is taken of envelope function 604 of the analytical signal. The Fourier transform is then analyzed in a frequency range which correlates with frequencies of vibrations that indicate the onset of mechanical degradation of the hard disk drive. The system then identifies deviations of the vibration signatures with respect to reference signatures to proactively detect incipient failures.

In one embodiment of the present invention, vibrations are measured at places where it is more probable to pick up vibration modes attributed to the defects or degradation of interest.

Computing a Vibration Signature

Figure 7:
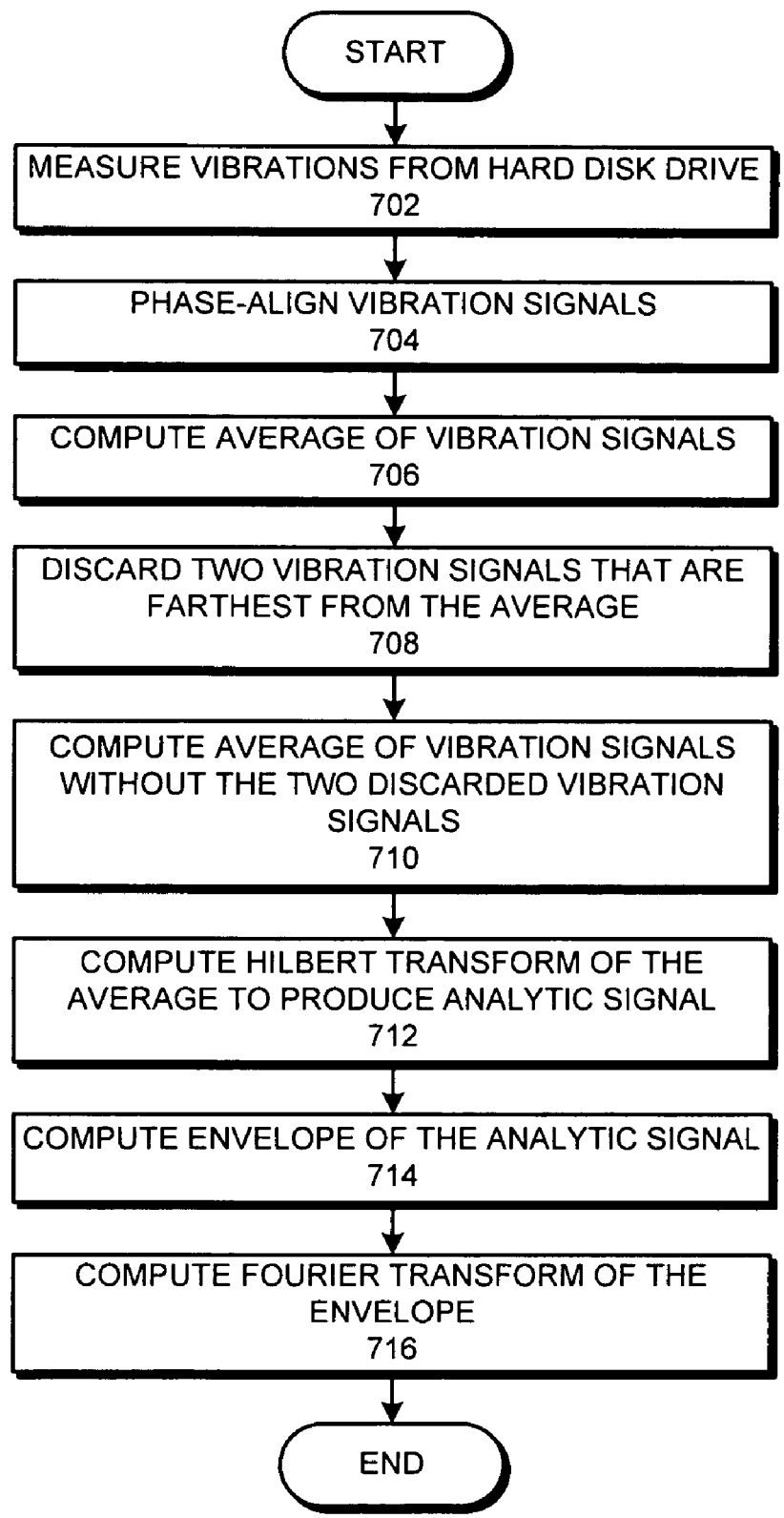
FIG. 7 presents a flow chart illustrating the process of computing a vibration signature for a hard disk drive in accordance with an embodiment of the present invention.

FIG. 7 presents a flow chart illustrating the process of computing a vibration signature for a hard disk drive in accordance with an embodiment of the present invention. The process begins when the system measures vibrations from the hard disk drive using an accelerometer (step 702). Note that the system collects N vibration signals during an idle phase between periods of disk activity (read/writes). The system then phase-aligns the N vibration signals (step 704)

Next, the system computes the average of the N vibration signals (step 706). The system then discards the two vibration signals that are farthest from the average (step 708), and computes the average of the vibration signals without the two discarded vibration signals (step 710). Next, the system computes the Hilbert transform of the averaged waveform to produce an analytic signal (step 712). The system then computes the envelope of the analytic signal (step 714) and computes the Fourier transform of the envelope to produce an idle-vibration signature of the hard disk drive (step 716).

In one embodiment of the present invention, the system generates a reference idle-vibration signature (RIVS) during a "training phase" (for example, when installing a new hard disk drive into a system). Note that the new hard disk drive is assumed to not be degraded or have defects in the spindle motor and the bearings during the training phase of data collection.

In one embodiment of the present invention, the system stores the RIVS of the hard disk drives in an easily accessible location such as a network file system, a local disk, or in memory. The RIVS represents the normal condition of the spindle motor and the bearings for the hard disk drive. The RIVS will be accessed frequently for comparisons with idle-vibration signatures obtained later in the life of the HDD.

Detecting the Onset of Hard Disk Drive Failure

Figure 8:
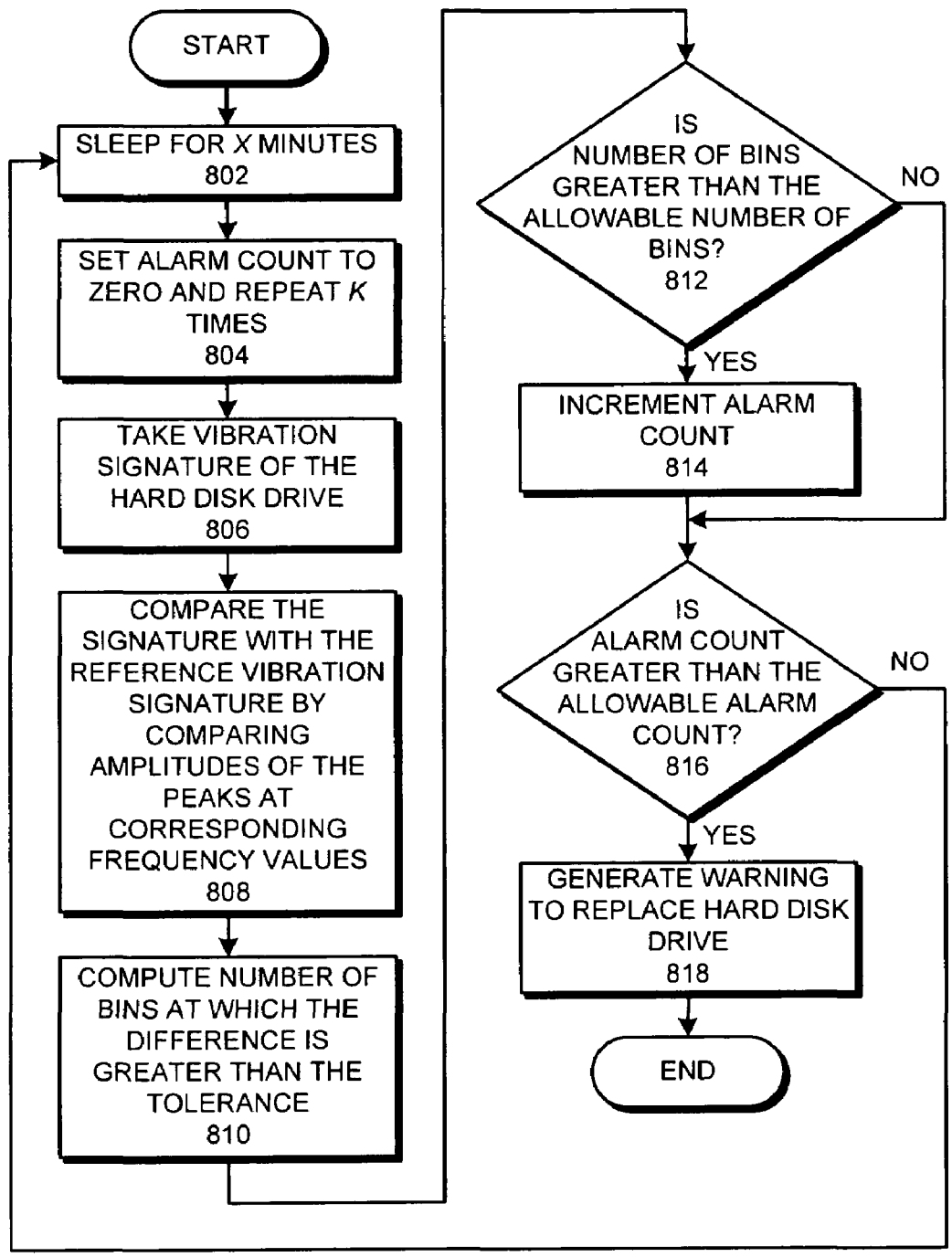
FIG. 8 presents a flow chart illustrating the process of determining whether a hard disk drive needs to be replaced in accordance with an embodiment of the present invention.

FIG. 8 presents a flow chart illustrating the process of determining whether a hard disk drive needs to be replaced in accordance with an embodiment of the present invention. The process begins when the system periodically monitors vibration signatures during normal operation of the hard disk drive. The system sleeps for X minutes (step 802), and sets the alarm count to zero and repeats the following steps K times (step 804). The system takes a current idle-vibration signature (CIVS) of the hard disk drive (step 806) (as is described in FIG. 7). Note that the system uses control variables or other mechanisms to assure that while acquiring the vibration signature for the hard disk drive, the hard disk drive is not seeking (reading or writing).

Next, the system compares the CIVS with the stored RIVS (step 808). The system examines the signature to see if there is the presence or absence of the reference peaks in the signature and/or the presence of peaks that were not seen in the reference signature. Note that both situations, namely the presence of new peaks and the absence of the reference peaks, indicate that an ongoing degradation of the spindle motor or bearings of the hard disk drive is taking place. This, in turn, indicates an elevated likelihood of a hard disk drive failure due to spindle motor and/or bearings problems The system then computes the number of bins at which the difference between the CIVS and RIVS is greater than a tolerance (step 810). If the number of bins is greater than the number of allowable bins (step 812—yes), the system increments the alarm count (step 814). Otherwise (step 812—no), the process continues to step 816.

Note that if the alarm count is greater than zero, indicating a developing problem, the system repeats steps 806 to 814 K times to assure that the CIVS is persistent and was not caused by an external shock.

If the alarm count is greater than the allowable alarm count (step 816—yes), the system generates a warning to replace the hard disk drive or takes a remedial action (step 818). Otherwise, the system returns to step 802 and sleeps for X minutes.

Note that the values of the parameters N, K, k are determined experimentally for each brand and model of hard disk drives to meet specified false-alarm and missed-alarm rates.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that detects vibrations from a mechanical component, comprising:
   an excitation rod coupled to the mechanical component, wherein the mechanical component includes at least one hard disk drive, chassis fan, power supply fan, processor fan, or component within a computer system that produces mechanical vibrations;
   a membrane which is coupled to the excitation rod, so that vibrations from the mechanical component are mechanically coupled through the excitation rod to the membrane, wherein the membrane converts the mechanical vibrations into acoustic waves that are transmitted through a medium;

a microphone which detects the acoustic waves in the medium and which converts the acoustic waves into signals; and a data acquisition system which is coupled to the microphone, wherein the signals generated by the microphone are received by the data acquisition system, wherein the data acquisition system generates a vibration signature from the signals, and wherein the data acquisition system detects an incipient failure of the mechanical component by identifying a deviation of the vibration signature with respect to a reference signature.

2. The apparatus of claim 1, wherein the medium includes air.

3. The apparatus of claim 1, further comprising an acoustically insulated enclosure which encloses the membrane, the microphone, and the medium, wherein the acoustically insulated enclosure prevents external acoustic sources from being detected by the microphone.

4. A method for detecting vibrations from a mechanical component, comprising:

using an excitation rod to couple vibrations from the mechanical component to a membrane, wherein the mechanical component includes at least one hard disk drive, chassis fan, power supply fan, processor fan, or component within a computer system that produces mechanical vibrations;

using the membrane to convert the mechanical vibrations into acoustic waves that are transmitted through a medium;

using a microphone to detect the acoustic waves in the medium and to convert the acoustic waves into signals; and using a data acquisition system, which is coupled to the microphone, to detect an incipient failure of the mechanical component;

wherein the signals generated by the microphone are received by the data acquisition system, wherein the data acquisition system generates a vibration signature from the signals, and wherein the data acquisition system detects an incipient failure of the mechanical component by identifying a deviation of the vibration signature with respect to a reference signature.

5. The method of claim 4, wherein the medium includes air.

6. The method of claim 4, further comprising using an acoustically insulated enclosure to enclose the membrane, the microphone, and the medium, wherein the acoustically insulated enclosure prevents external acoustic sources from being detected by the microphone.

7. A method for manufacturing an apparatus that detects vibrations from a mechanical component, comprising:

coupling an excitation rod to a membrane;

placing the membrane and the rod in a medium, wherein the membrane converts the mechanical vibrations into acoustic waves that are transmitted through the medium;

placing a microphone in the medium, wherein the microphone detects the acoustic waves in the medium and converts the acoustic waves into signals;

coupling a data acquisition system to the microphone, wherein the signals generated by the microphone are received by the data acquisition system, wherein the data acquisition system generates a vibration signature from the signals, and wherein the data acquisition system detects an incipient failure of the mechanical component by identifying a deviation of the vibration signature with respect to a reference signature; and coupling the excitation rod to a mechanical component, wherein the mechanical component includes at least one hard disk drive, chassis fan, power supply fan, processor fan, or component within a computer system that produces mechanical vibrations, and wherein vibrations from the mechanical component are mechanically coupled through the excitation rod to the membrane.

8. The method for manufacturing the apparatus of claim 7, wherein the medium includes air.

9. The method for manufacturing the apparatus of claim 7, further comprising enclosing the membrane, the microphone, and the medium in an acoustically insulated enclosure, wherein the acoustically insulated enclosure prevents external acoustic sources from being detected by the microphone.

10. The method for manufacturing the apparatus of claim 7, further comprising adjusting physical properties of the membrane to adjust the amplitude of the acoustic waves generated by the membrane.

* * * * *